United States Patent
Cucchiara

(10) Patent No.: US 6,430,614 B1
(45) Date of Patent: Aug. 6, 2002

(54) METHOD AND APPARATUS FOR PROVIDING AND FACILITATING INTERACTION WITH DISTRIBUTED MANAGER INFORMATION OF A NETWORK

(75) Inventor: Joan E. Cucchiara, Concord, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/615,864

(22) Filed: Jul. 13, 2000

Related U.S. Application Data

(63) Continuation of application No. 09/145,050, filed on Sep. 1, 1998, now Pat. No. 6,141,680.

(51) Int. Cl.[7] .............................................. G06F 15/173
(52) U.S. Cl. ...................... 709/223; 709/201; 345/763
(58) Field of Search ................................. 709/223, 224, 709/201, 203, 204, 229, 202; 345/356, 348, 349, 330, 763

(56) References Cited

U.S. PATENT DOCUMENTS

| | | |
|---|---|---|
| 5,333,183 A | 7/1994 | Herbert |
| 5,473,608 A | 12/1995 | Gagne et al. |
| 5,495,607 A | 2/1996 | Pisello et al. |
| 5,655,081 A | 8/1997 | Bonnell et al. |
| 5,742,286 A | 4/1998 | Kung et al. |
| 5,758,083 A | 5/1998 | Singh et al. |
| 5,764,911 A | 6/1998 | Tezuka et al. |
| 5,793,974 A | 8/1998 | Messinger |
| 5,805,785 A | 9/1998 | Dias et al. |
| 5,821,937 A * | 10/1998 | Tonelli et al. ............... 345/356 |
| 5,835,898 A | 11/1998 | Borg et al. |
| 5,845,081 A | 12/1998 | Rangarajan et al. |
| 5,948,055 A | 9/1999 | Pulsipher et al. |
| 5,961,597 A * | 10/1999 | Sapir et al. .................. 709/224 |
| RE36,444 E * | 12/1999 | Sanchez-Frank et al. ... 345/349 |
| 6,046,742 A | 4/2000 | Chari |
| 6,054,987 A * | 4/2000 | Richardson .................. 345/348 |
| 6,141,680 A * | 10/2000 | Cucchiara .................... 709/201 |
| 6,225,999 B1 * | 5/2001 | Jain et al. .................... 345/356 |

OTHER PUBLICATIONS

Bierman, Andy and Jones, Kendall S., "Physical Topology MIB", Sep. 1997, pp. 1–35.
Levi, David B. and Schoenwaelder, Juergen, "Definitions of Managed Objects for the Delegation of Management Scripts", Nov. 1997, pp. 1–45.
Levi, David B. and Schoenwaelder, Juergen, "Fefinitions of Managed Objects for Scheduling Management Operations", Feb. 1998, pp. 1–18.
Stewart, Bob, "Notification MIB", Mar. 26, 1997. pp. 1–27.
Bierman, et al., "Distributed Management Framework", Dec. 1997, pp. 1–26.
Steward, Bob, "Expression MIB", Nov. 21, 1997, pp. 1–36.
Stewart, Bob; "Event MIB", Nov. 21, 1997, pp. 1–25.
Bierman, Andy and McCloghrie, Keith, "PTOPO Discover Protocol and MIB", Sep. 1997, pp. 1–31.
Case, et al, "Manager–to–Manager Management Information Base", Network Working Group, RFC 1451, pp. 1–36.
Dave McClenaghou, "Network Node Manager 4–1 Operation Guide", Manchester Computing, www.net.mcc.uc.uk/information/netmanagement/iovmn4pl.htm.
Bruce, Boardman, "Enterprise Management is Just Around the Corner", Network Computing, pp. 58–74.
"DCA Intros Netwizard Software Mgt Systems", Newsbytes News Network.

* cited by examiner

Primary Examiner—Mehmet B. Geckil
(74) Attorney, Agent, or Firm—Blakely Sokoloff Taylor & Zafman LLP

(57) ABSTRACT

A method and apparatus for providing and facilitating interaction with distributed manager information of a network identifies a set of distributed managers within the network and also identifies, for each distributed manager in the set, a client system assigned to the distributed manager. A distributed manager of the set of distributed managers and the client system assigned to the distributed manager are also displayed, via a graphical user interface.

39 Claims, 7 Drawing Sheets

METHOD AND APPARATUS FOR PROVIDING AND FACILITATING INTERACTION WITH DISTRIBUTED MANAGER INFORMATION OF A NETWORK

CROSS REFERENCE TO RELATED APPLICATION

This is a continuation of application Ser. No. 09/145,050, filed Sep. 1, 1998 now U.S. Pat. No. 6,141,680.

BACKGROUND OF THE INVENTION

1. Field of the Invention

The present invention pertains to distributed network management. More particularly, this invention relates to providing and facilitating interaction with distributed manager information of a network, and managing distributed manager entities of a network in an orderly and redundant fashion.

2. Background

Computer systems are increasingly becoming commonplace in homes and businesses throughout the world. As the number of computer systems increases, more and more computer systems are becoming interconnected via networks. These networks include local area networks (LANs), such as are commonly found in businesses and educational facilities throughout the world, as well as some homes. LANs also frequently have an interface to other networks, such as a wide area network (WAN) or the Internet, and this interface needs to be monitored and controlled by network management on the LAN.

One concern encountered with networks is referred to as network management. Network management refers to monitoring and controlling of the network devices and includes the ability for an individual, typically referred to as an administrative user, to be able to access, monitor, and control the devices that are part of the network or access, monitor and control the interfaces of the network coupled to other computer systems. Such access, monitoring, and control often includes the ability to check the operating status of devices, receive error information for devices, change configuration values, etc. As the size of networks (that is, the number of devices that are part of the network) increases, so too does the need for network management.

One type of network management that can be used is referred to as distributed management. In a network employing distributed management, multiple distributed manager entities are established that perform access, monitoring, and control functions for selected devices that are part of or interfaced to the network. These distributed manager devices can then be accessed by an administrative user. However, one problem typically encountered with distributed management networks is the lack of ability for the distributed management system to provide to the administrative user user-friendly feedback and/or management and/or redundancy capabilities for the distributed managers. This problem is only exacerbated as the size of networks increases.

Thus, a need exists for an improved way to provide and facilitate interaction with distributed manager information of a network.

SUMMARY OF THE INVENTION

A method and apparatus for providing and facilitating interaction with distributed manager information of a network is described herein. According to one aspect of the invention, a method for displaying distributed manager information for a network identifies a set of distributed managers within the network and also identifies, for each distributed manager in the set, a client system assigned to the distributed manager. A distributed manager of the set of distributed managers and the client system assigned to the distributed manager are also displayed, via a graphical user interface.

According to one aspect of the present invention, distributed managers of the set of distributed managers that are overburdened are identified, and the overburdened distributed managers are displayed in a manner that distinguishes the overburdened distributed managers from the non-overburdened distributed managers.

According to one aspect of the present invention, both distributed managers of the set of distributed managers and client systems are displayed as icons, and assignment of which manager manages a client system can be changed by dragging and dropping an icon corresponding to the client system on an icon corresponding to a distributed manager.

According to one aspect of the present invention, an indication of a manager that is a backup for another manager is displayed via the graphical user interface.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
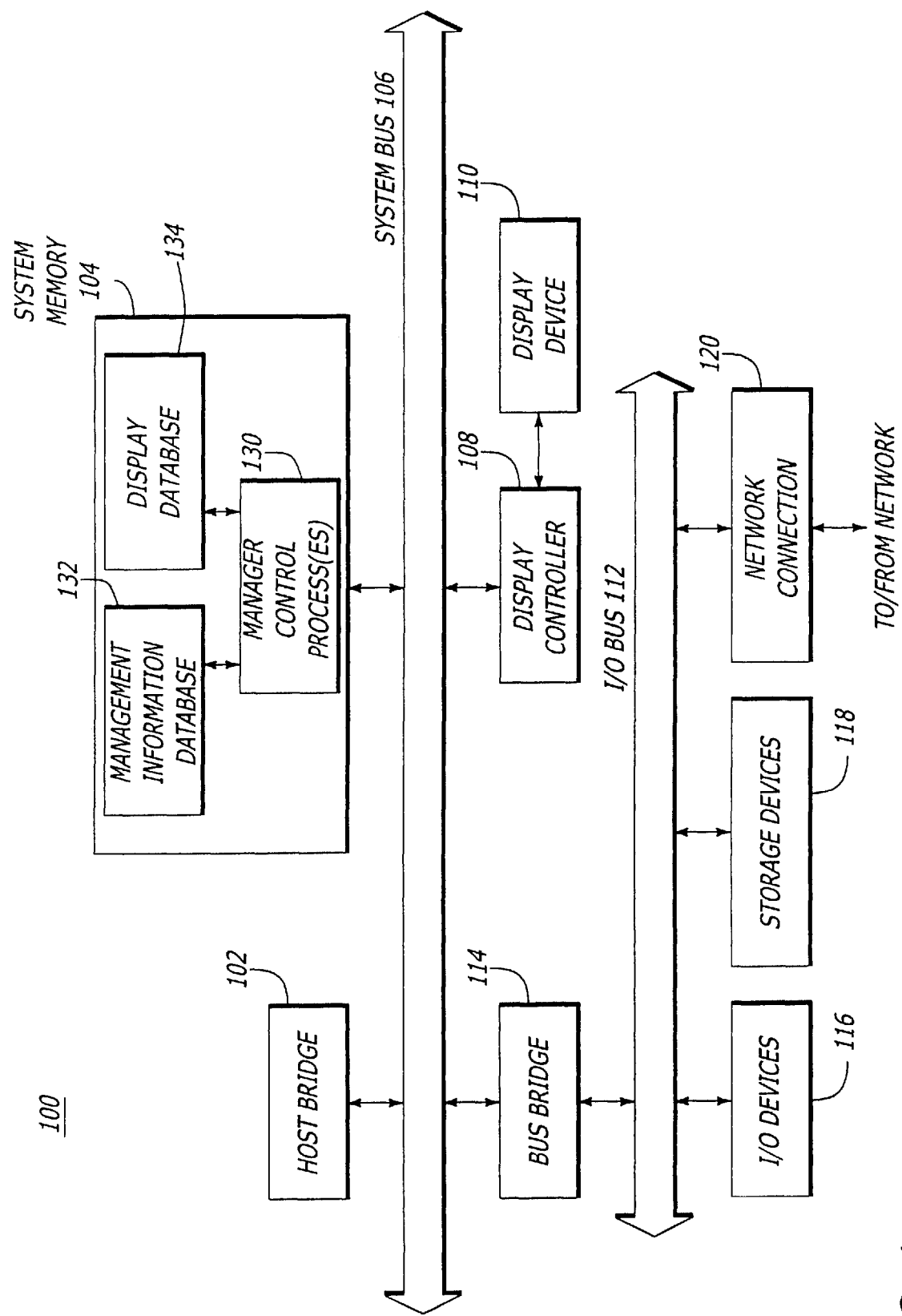
FIG. 1 illustrates a hardware system or machine incorporating one embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing"0 or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a user interface for facilitating user interaction (typically an administrative user) with a distributed manager hierarchy within a network. Distributed manager and client system icons are displayed to a user within the context of the network topology, thereby providing the user with graphical information identifying which distributed managers are managing which client systems. According to one aspect of the present invention, the assignment of client systems to distributed managers can be modified by a user via the interface of the present invention by "dragging and dropping" client system icons on the appropriate manager icons. Additionally, according to one aspect of the invention, information regarding potential problems with the current distributed management setup (e.g., "overburdened" managers) is also provided in the display.

FIG. 1 illustrates a hardware system or machine incorporating one embodiment of the present invention. As illustrated, hardware system 100 includes processor 102, system bus 106, and input/output (I/O) bus 112. Bridge 114 couples system bus 106 to I/O bus 112. Coupled to system bus 106 are system memory 104, display controller 108, and display device 110. Coupled to bus 112 are I/O devices 116, non-volatile mass storage device(s) 118, and network/communication interface 120. I/O devices 116 are intended to represent a broad range of conventional input, output, and input/output devices including cursor control devices (e.g., a mouse, trackball, trackpad, touchscreen, etc.), alphanumeric input devices (e.g., keyboards), printers, scanners, etc.

These elements 102–120 perform their conventional functions known in the art. In particular, network/communication interface 120 is used to provide communication between system 100 and any of a wide range of conventional networks, such as an Ethernet, token ring, the Internet, etc. It is to be appreciated that the circuitry of interface 120 is dependent on the type of network the system 100 is being coupled to.

Mass storage device(s) 118 is used to provide permanent storage for the data and programming instructions to implement one embodiment of the present invention, whereas system memory 104 is used to provide temporary storage for the data and programming instructions when executed by processor 102. Mass storage device 118 may be provided with the programming instructions by loading the programming instructions from a distribution storage medium (not shown), or by downloading the programming distributions from a server (not shown) coupled to hardware system 100 via network/communication interface 120. Collectively, these elements are intended to represent a broad category of hardware systems, including but not limited to general purpose computer systems based on processors available from Intel Corporation of Santa Clara, Calif., from Advance Micro Devices (AMD) of Sunnyvale, Calif., from National Semiconductor of Sunnyvale, Calif., or from Digital Equipment Corporation (DEC) of Maynard, Mass.

It is to be appreciated that various components of hardware system 100 may be rearranged. Furthermore, certain implementations of the present invention may not require nor include all of the above components. For example, storage device(s) 118 may not be included in system 100. Additionally, the peripheral devices shown coupled to I/O bus 112 may be coupled to system bus 106; in addition, in some implementations only a single bus may exist with the components of hardware system 100 being coupled to the single bus. Furthermore, additional components may be included in system 100, such as additional processors, storage devices, memories, I/O devices, etc.

In one embodiment, the present invention is implemented as a series of software routines run by the hardware system of FIG. 1. These software routines comprise a plurality or series of instructions to be executed by a processor in a hardware system, such as processor 102. Initially, the series of instructions are stored on a storage device, such as mass storage device 118. The instructions are copied from storage device 118 into memory 104 and then accessed and executed by processor 102. In one implementation, these software routines are written in the C++ programming language. It is to be appreciated, however, that these routines may be implemented in any of a wide variety of programming languages or may be part of a Java applet. In alternate embodiments, the present invention is implemented in discrete hardware or firmware. For example, an application specific integrated circuit (ASIC) could be programmed with the functions of the present invention.

In the illustrated embodiment, manager control process (es) 130 in system memory 104 controls the information being displayed as part of the user interface in accordance with the present invention. Additionally, manager control 130 includes the processes for changing assignments of client systems to distributed managers and communicating with various other devices within the network environment. The operation of manager control 130 in accordance with various embodiments of the present invention are discussed in more detail below with reference to the following figures. Also in memory 104 are management information database 132 and display database 134, which store various data used by manager control process(es) 130. Management information database 132 stores the management information identified in accordance with the present invention, including which client systems are assigned to which managers and which managers report to which other managers (if any). Display database 134 stores various icons used by manager control process 130 in providing the interface of the present invention.

Figure 2:
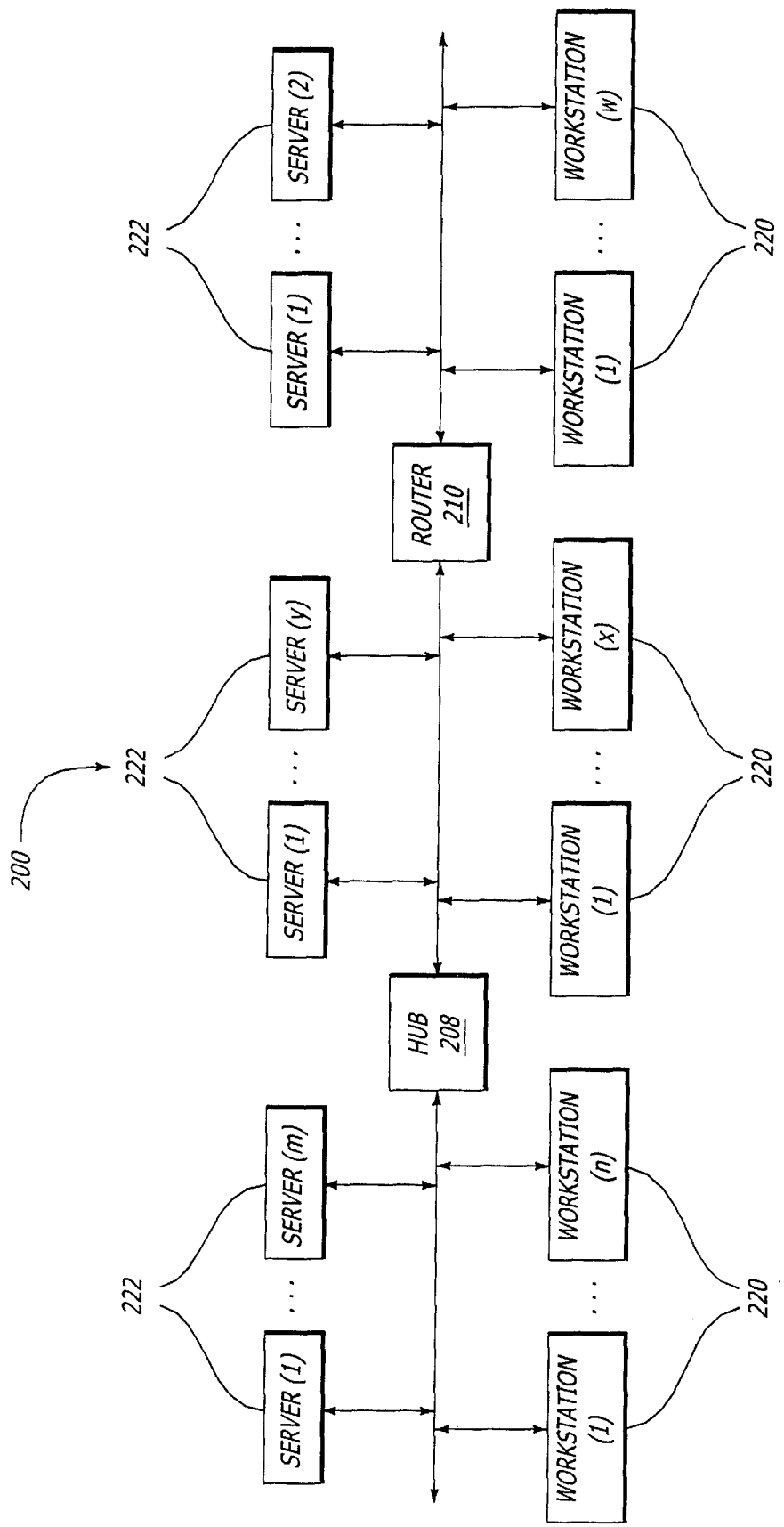
FIG. 2 illustrates a network environment in which one embodiment of the present invention can be used.

FIG. 2 illustrates a network environment in which one embodiment of the present invention can be used. Multiple workstation systems 220 and server systems 222 are included within environment 200, each coupled to one of multiple network segments 202, 204, and 206. Each of these segments is coupled to one another by hub 208 and/or router 210, thereby allowing any of the systems 220 and 222 to communicate with any other of the systems 220 and 222.

Network environments typically include one or more "managers" whose function it is to monitor and provide select management control for the network. Various network status information is provided to the manager(s) by workstation and server systems within the network as well as possibly other managers. Such status information includes, for example, indications of application errors, etc. In the illustrated embodiment, environment 200 is managed according to a distributed management methodology. The distributed management methodology allows the management responsibility for the network to be spread out among multiple managers distributed throughout the network rather than at a single central manager. Any of a variety of conventional methodologies may be used to implement distributed management, such as the methodology described in the Internet-Draft "Distributed Management Framework" by Andy Bierman, et al., December 1997.

Any number of workstation systems 220 and server systems 222 could be set up as a distributed manager. Typically, a manager system performs additional functions and processing in its capacity as a workstation or server system as well as those functions which provide the distributed manager capabilities. However, in alternate embodiments dedicated manager systems can be used.

In a distributed management system, management information is maintained by communicating messages between systems. A client system communicates status information to the distributed manager that has responsibility for managing that client system. As used herein, "client system" refers to a "client" relative to the distributed management system. A client system can be assigned to be managed by a distributed manager, and may be a workstation, a server, etc. For example, when an error occurs at the client system a message identifying the occurrence of that error is communicated to the distributed manager. The client system can be pre-programmed with information identifying which manager it is to communicate status information to, or alternatively the manager system could send a message to the client system identifying itself as the manager for that client system. Additionally, manager systems may be distributed in a hierarchical manner, with some managers communicating or reporting status information to other managers.

According to one embodiment, the present invention is implemented at one or more of the manager systems. In other words, a distributed manager within the network provides an interface for displaying and controlling the distributed management of the network.

Figure 3:
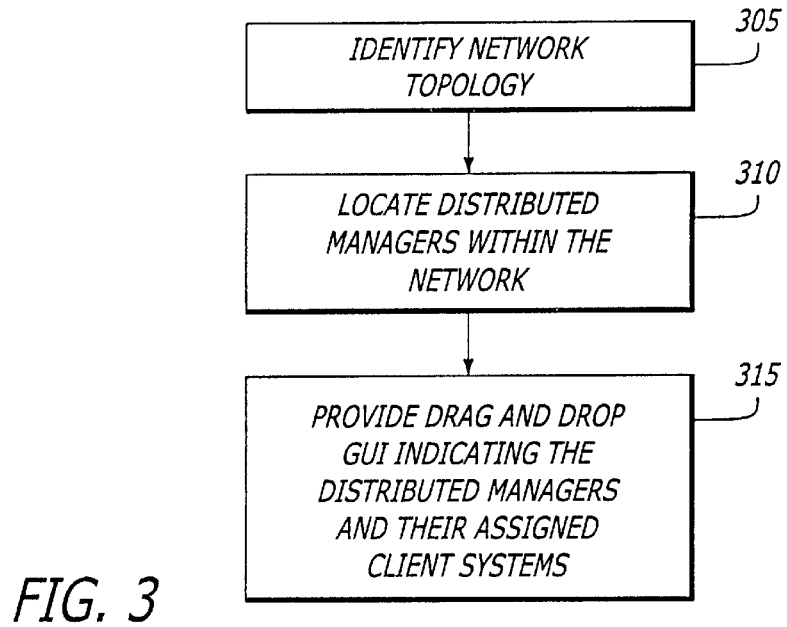
FIG. 3 is a flowchart illustrating the process followed displaying distributed manager information according to one embodiment of the present invention.

FIG. 3 is a flowchart illustrating the process followed displaying distributed manager information according to one embodiment of the present invention. Initially, manager control process 130 of FIG. 1 identifies the network topology, step 305. The topology of the network is defined as the manner in which devices in the network are interconnected, the devices including client systems, server systems, routers, hubs, etc. Additionally, in the illustrated embodiment this identification includes identifying "management" hierarchy information, which refers to the hierarchy of which client systems report to which distributed managers, as well as which distributed managers report to which other distributed managers. This identification can be done in any of a wide variety of conventional manners, such as by use of Optivity, available from Bay Networks, Inc. of Santa Clara, Calif., or in accordance with the Internet-Draft "Physical Topology Discovery Protocol and MIB" by Andy Bierman and Keith McCloghrie, September, 1997.

The manager control process then identifies the locations of the distributed managers within the network topology, step 310. This manager location identification is carried out by accessing the topology information obtained in step 305 and extracting the management hierarchy information. Thus, the manager control process is able to identify which systems within the network are distributed managers, as well as which client systems are managed by which distributed managers.

Once the network topology and the locations of the distributed managers are identified, manager control process 130 generates and displays a "drag and drop" graphical user interface (GUI) that identifies the distributed managers as well as the client systems assigned to the distributed managers, step 315. Manager control process 130 displays different icons to represent the distributed managers and client systems, as discussed in more detail below. According to one embodiment of the present invention, the GUI provided by manager control process 130 identifies the distributed managers and their locations using a "tree" structure, as discussed in more detail below.

Figure 4:
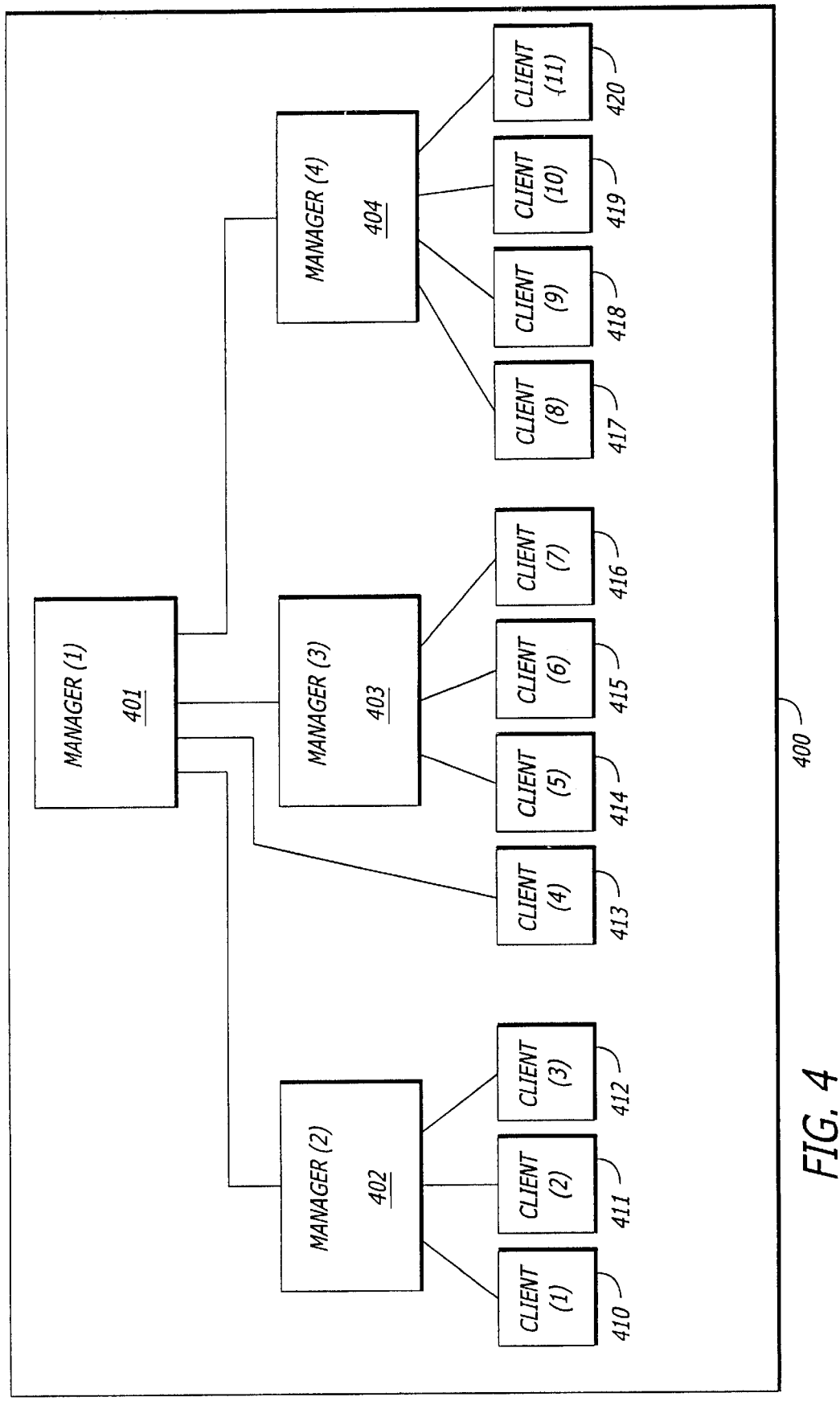
FIG. 4 illustrates a graphical user interface identifying the management topology of a network topology according to one embodiment of the present invention.

FIG. 4 illustrates a GUI identifying the management topology of a network topology according to one embodiment of the present invention. As illustrated in FIG. 4, four distributed managers are part of the network as illustrated by distributed manager icons 401, 402, 403, and 404, as well as eleven client systems as illustrated by client system icons 410–420. The management topology identifies which of these client systems corresponding to client icons 410–420 report to which of the distributed managers corresponding to manager icons 401–404, as well as which managers corresponding to manager icons 401–404, if any, report to which other managers corresponding to icons 401–404. Thus, by way of example client systems corresponding to icons 410–412 report to the manager corresponding to icon 402, the client system corresponding to client icon 413 reports to the manager corresponding to manager icon 401, client systems corresponding to client icons 414–416 report to the manager corresponding to manager icon 403, and the client systems corresponding to client icons 417–420 report to the manager corresponding to manager icon 404. Furthermore, the managers corresponding to manager icons 402–404 report to the manager corresponding to manager icon 401. Thus, GUI 400 provides an informative display to the user of which client systems are being managed by which distributed managers.

In the illustrated embodiment of FIG. 4, a "primary" distributed manager corresponding to manager icon 401 is included. The "primary" manager is the manager at the "top" of the hierarchy; that is, the manager to which status information from all client systems eventually migrates. In alternate embodiments, no such "primary" distributed manager exists.

The assignments of which client systems are being managed by which distributed manager can be changed through GUI 400. Manager control process 130 of FIG. 1 allows assignments to be changed by simply "dragging and dropping" a client icon onto the appropriate distributed manager icon. For example, a user can select client icon 415 and drag it onto manager icon 402, thereby changing the assignment of the client system corresponding to client icon 415 to the manager corresponding to manager icon 402 rather than the manager corresponding to manager icon 401.

In order to effectuate an assignment change, manager control process 130 sends messages to the client and manager systems involved to notify them of the change. According to the previous example, manager control process 130 sends a message to the client system corresponding to client icon 415 that it is to communicate status information to the manager corresponding to manager icon 402 rather than the manager corresponding to manager icon 403. Additionally, manager control process 130 sends messages to the managers corresponding to manager icons 402 and 403 that the management responsibility for the client system corresponding to client icon 415 has been changed from the manager corresponding to manager icon 403 to the manager corresponding to manager icon 402. Alternatively, the manager corresponding to manager icon 403 need only be informed that it is no longer responsible for managing the client system corresponding to client icon 415 without being informed of which manager is taking over responsibility for managing that client system.

Alternate embodiments allow assignment of client systems to managers in different manners than the drag and drop methodology. According to one such alternate embodiment, selection of a client icon (e.g., clicking on a right mouse button while the cursor is over the client icon) causes manager control process 130 of FIG. 1 to bring up a menu listing all of the distributed managers to which the client system corresponding to the selected icon can be assigned. Selection of one of the distributed managers then causes the assignment to be changed.

Alternate embodiments other than the tree structure illustrated in FIG. 4 can also be used to identify the topology. In one such alternate embodiment systems are color coded. For example, client system icons and the corresponding manager icon representing the manager to which the clients are assigned are all the same color, or have an outline in the same color. A manager icon corresponding to a manger of multiple other managers (e.g., manager icon 401) could include multiple colors (e.g., multiple colors of outlining).

Figure 5:
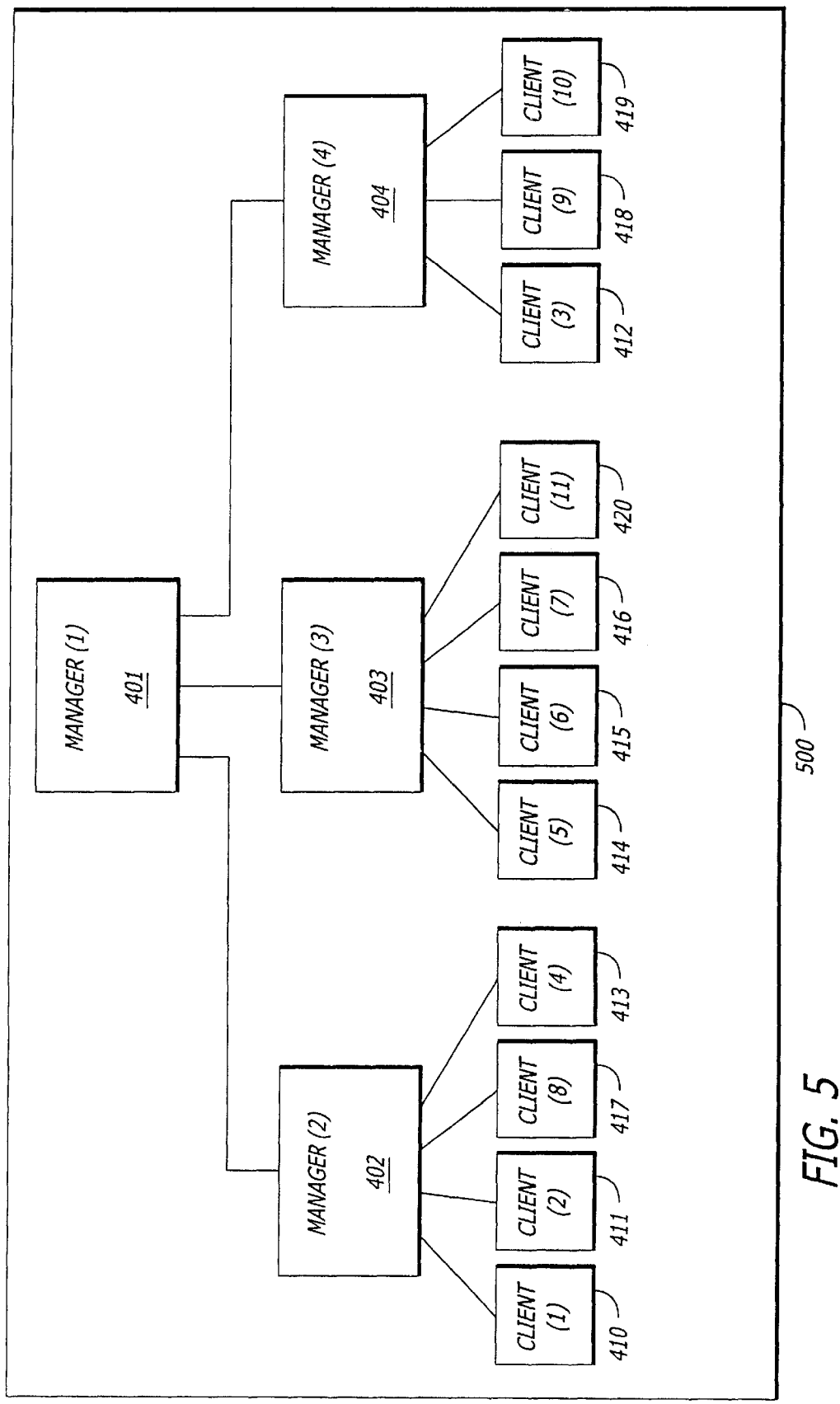
FIG. 5 illustrates a graphical user interface with a modified management topology from that illustrated in FIG. 4.

FIG. 5 illustrates a GUI with a modified management topology from that illustrated in FIG. 4. As illustrated in FIG. 5, the assignment of client systems to distributed managers has been modified, so that the client system corresponding to client icon 412 reports to the manager corresponding to manager icon 404 rather than the manager corresponding to manager icon 402, the client system corresponding to client icon 413 reports to the manager corresponding to manager icon 402 rather than the manager corresponding to manager icon 401, the client system corresponding to client icon 417 reports to the manager corresponding to manager icon 402 rather than the manager corresponding to manager icon 404, and the client system corresponding to client icon 420 reports to the manager corresponding to manager icon 403 rather than the manager corresponding to manager icon 404. Thus, management responsibility for client systems an be easily modified via a user-friendly GUI form at in accordance with the present invention.

However, one problem that can occur in distributed management systems is that distributed managers within the network can become overburdened. As discussed above, different managers are assigned to manage different client systems and there is typically no required control over the number of client systems being managed by a particular manager. A distributed manager that is managing a large enough number of client systems can be termed "overburdened". The number of client systems that are managed in order to be "overburdened" can be a static value (e.g., twenty), or a dynamic value (e.g., exceeds the average number of client systems by ten, or exceeds the average number of client systems by forty percent). According to one aspect of the present invention, overburdened distributed managers are identified as part of the GUI provided by manager control process 130 of FIG. 1.

Figure 6:
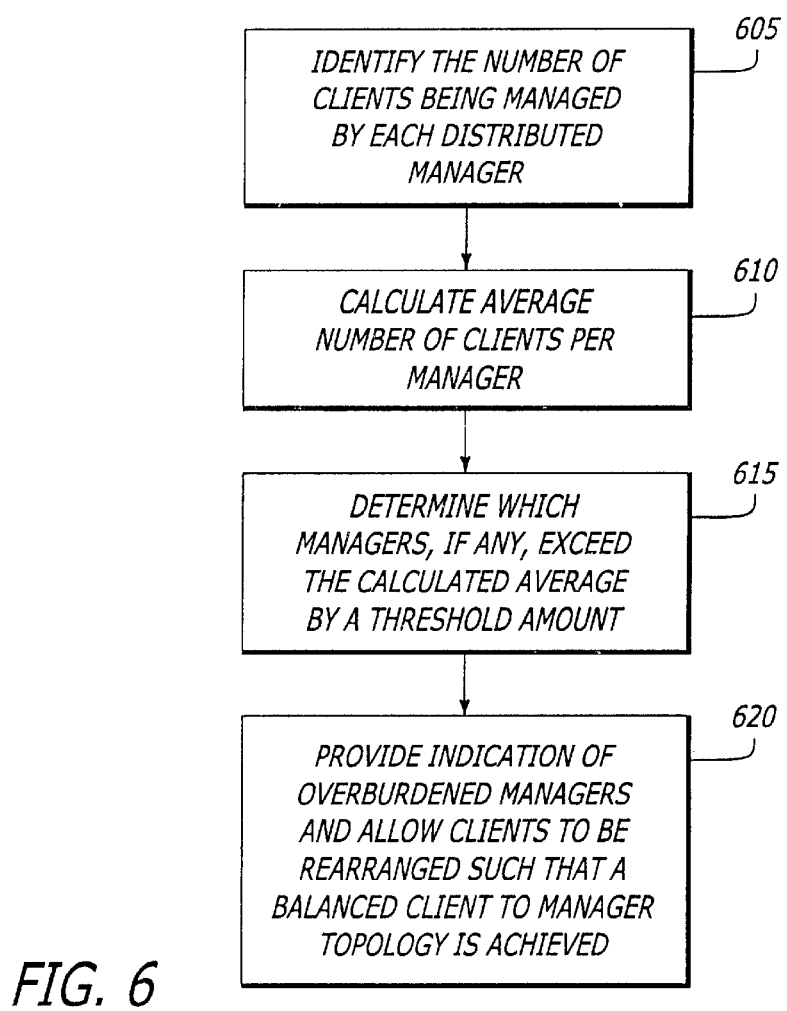
FIG. 6 is a flowchart illustrating the steps followed in providing an indication of overburdened distributed managers according to one embodiment of the present invention.

FIG. 6 is a flowchart illustrating the steps followed in providing an indication of overburdened distributed managers according to one embodiment of the present invention. As illustrated, manager control process 130 of FIG. 1 first identifies the number of client systems being managed by each distributed manager in the network, step 605. Manager control process 130 then calculates an average number of clients per manager, step 610.

The manager control process then determines which managers, if any, exceed the calculated average by a threshold amount, step 615. The threshold amount can be a static value (e.g., fifteen) or alternatively can be a dynamic value (e.g., thirty five percent of the calculated average). According to one embodiment of the present invention, manager control process 130 allows a user (e.g., an administrative user) to alter the threshold amount.

The manager control process then provides an indicator on the GUI of those managers, if any, which exceed the calculated average by the threshold amount, step 620. This indicator of overburdened managers can be provided in any of a wide variety of conventional manners, such as displaying a list identifying each overburdened manager, using different icons or different colors for the manager icons corresponding to overburdened managers (e.g., outlined in red), "flashing" or "blinking" icons corresponding to overburdened managers, etc.

In an alternate embodiment, the manager control process determines overburdened managers using a fixed value rather than a calculated average. Thus, in this alternate embodiment step 610 is not necessary and the managers, if any, which are determined to exceed this fixed value in step 615 are identified as the overburdened managers. The fixed value in this alternate embodiment can be a predetermined value or a user-identified (e.g., an administrative user) value. By way of example, the manager control process may be programmed to identify any manager that is managing more than fifty client systems as being overburdened.

Additionally, according to one embodiment of the present invention "underburdened" distributed managers are also identified by manager control process 130. An underburdened manager is a manger that manages less than a particular number of client systems (analogous to overburdened managers, this can be a static or dynamic based on a calculated average, or a fixed value). Indications of underburdened managers can be provided in any of a wide variety of conventional manners, such as different icons, different colors, a listing, etc.

Figure 7:
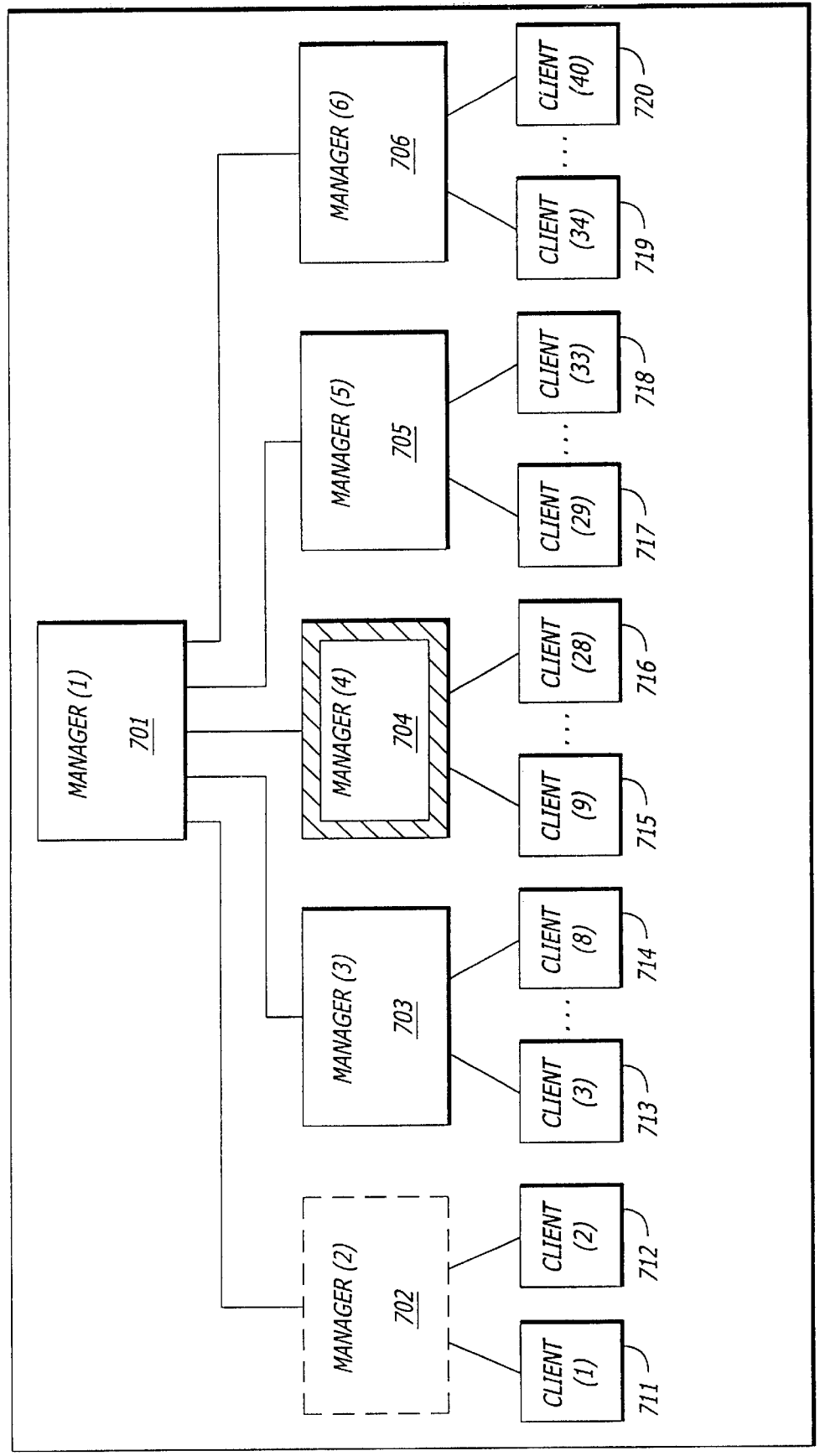
FIG. 7 illustrates a graphical user interface providing an indication of overburdened distributed managers according to one embodiment of the present invention.

FIG. 7 illustrates a GUI providing an indication of overburdened distributed managers according to one embodiment of the present invention. As illustrated, multiple distributed managers corresponding to manager icons 701–706 are managing multiple client systems corresponding to client icons 711–720. A total of forty client systems are being managed, two by the manager corresponding to manager icon 702, six by the manager corresponding to manager icon 703, twenty by the manager corresponding to manager icon 704, five by the manager corresponding to manger icon 705, and seven by the manager corresponding to manager icon 706.

In the illustrated embodiment, manager icon 704 is highlighted on the GUI to indicate that the corresponding distributed manager is overburdened. Additionally, manager icon 703 is highlighted in a different manner to indicate that the corresponding distributed manager is underburdened.

Additionally, according to one embodiment of the present invention the distributed managers can provide backup or redundancy for one another. When redundancy is used, a distributed manager can be assigned as backup to one or more other distributed managers, and each distributed manager can have one or more backup managers. A backup manager maintains the same management information regarding the client systems being managed by the backed up manager as the backed up manager keeps. Thus, if a problem occurs with the backed up manager (e.g., hardware or software failure), then the backup manager can step in and take the place of the problem manager. Redundancy information identifying which manager is a backup for which other manager(s) can be identified in any of a wide variety of conventional manners, such as by polling the managers for such information, by obtaining the information from the network topology identification step 305 of FIG. 3 discussed above, etc.

In order to support redundancy, a mechanism for allowing the backup manager to have access to the backed up manager is used. According to one embodiment, a backed up manager communicates messages to the backup manager providing the status information that the backed up manager receives from client systems. This can be via a synchronization program, such as SCSP (Server Cache Synchronization Protocol), or manager-to-manager communications can be performed when new status information is received from a client system, or alternatively can be performed at different intervals.

Additionally, a mechanism for allowing the backup manager to know when the backed up manager has failed is also used. According to one embodiment, a backup manager continually polls the backed up manager at various intervals. If a response to the polling is received, then the backed up manager is presumed to be working. However, if no response to the polling is received, then the backed up manager is presumed to have failed. Alternatively, the backed up manager could send "still active" messages to the backup manager at various intervals, and the backup manager presumes the backed up manager has failed if such a message is not received at the proper time (based on the interval being used).

Figure 8:
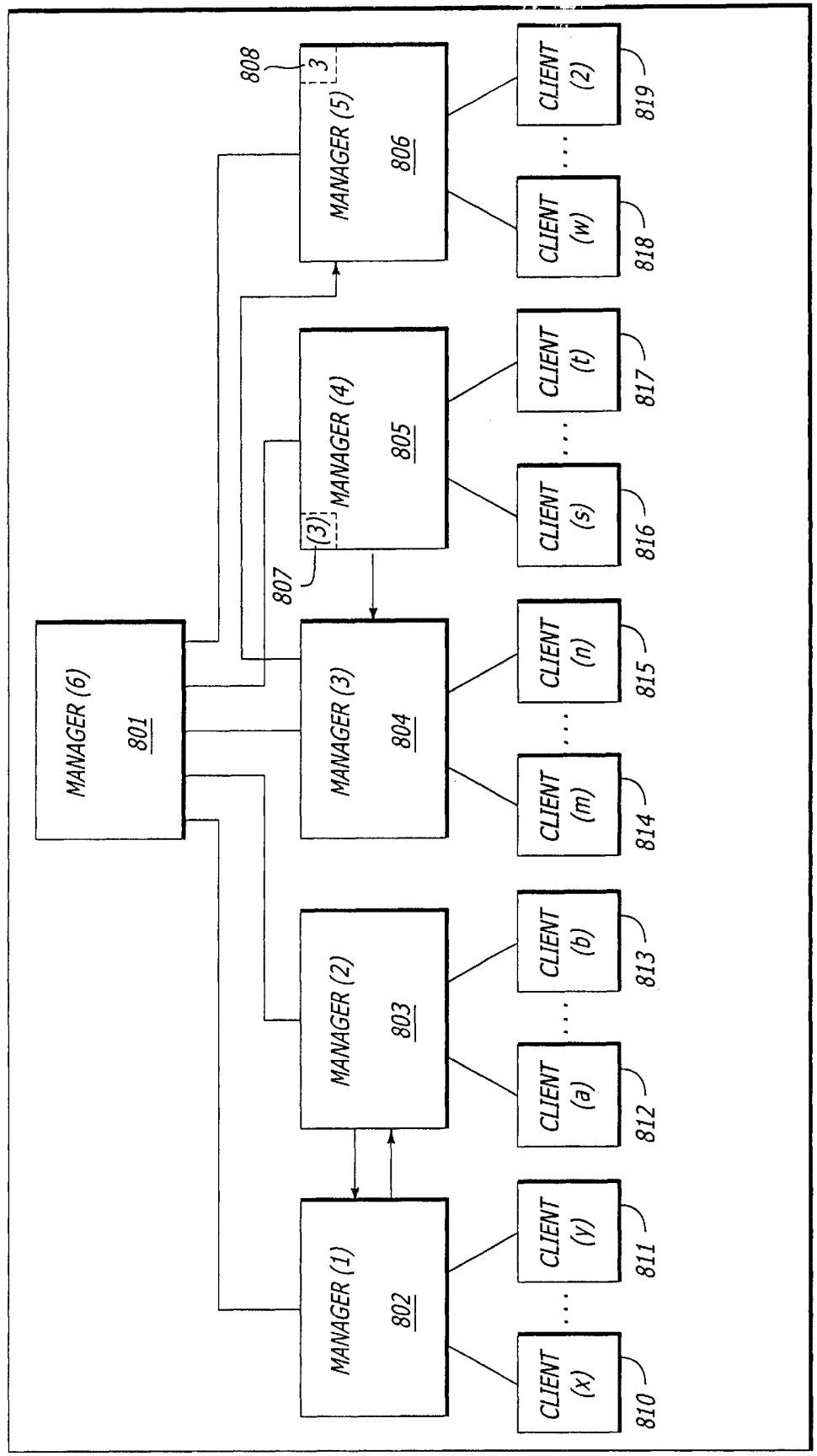
FIG. 8 illustrates a graphical user interface providing manager redundancy information according to one embodiment of the present invention.

FIG. 8 illustrates a GUI providing manager redundancy information according to one embodiment of the present invention. As illustrated, multiple distributed managers corresponding to manager icons 801–806 are included in the network topology, along with multiple client systems corresponding to client icons 810–819. Directional arrows are illustrated in the embodiment of FIG. 8 to provide an indication of which manager serves as a backup or redundant manager for another manager. For example, the manager corresponding to manager icon 802 is a backup for the manager corresponding to manager icon 803, and vice versa. By way of another example, the manager corresponding to manager icon 804 is a backup for the manager corresponding to manager icon 805, while the manager corresponding to manager icon 806 is a backup for the manager corresponding to manager icon 804. It should be noted that these directional arrows can be the same color (and same line width, etc.) as those used to identify the management reporting relationships, or alternatively can be of different colors to help distinguish them for a viewer.

Alternatively, rather than using directional arrows, an additional label may be used to identify backup managers. For example, a label 807 identifying icon 804 can be located in the upper left corner of manager icon 805 to indicate that the manager corresponding to manager icon 804 (and label 807) is a backup for the manager corresponding to manager icon 805. By way of another example, a label 808 identifying icon 804 can be located in the upper right corner of manager icon 806 to indicate that the manager corresponding to manager icon 806 is a backup for the manager corresponding to manger icon 804.

Additionally, according to one embodiment manager control process 130 allows a user (e.g., an administrative user) to alter redundancy assignments. New redundancies can be created by, for example, dragging and dropping one manager icon onto another. Alternatively, manager control process 130 could provide a menu listing of potential backup managers in response to selection of a manager icon. Redundancies can be removed by, for example, selecting and deleting (e.g., by use of a delete key on a keyboard or a delete icon or menu option as part of the GUI) a directional arrow. By way of example, dragging and dropping manager icon 803 on manager icon 804 could cause in the manager corresponding to manager icon 804 becoming the backup for the manager corresponding to manager icon 803. Additionally, selection and deletion of the directional arrow from manager icon 805 to manager icon 804 could cause the manager corresponding to manager icon 804 to no longer be a backup for the manger corresponding to manager icon 805.

In order to effectuate a redundancy change, manager control process 130 sends messages to the manager systems involved to notify them of the change. According to the previous two examples, manager control process 130 sends a message to the manager corresponding to manager icon 804 that it is now a backup manager for the manager corresponding to manager icon 803, and also sends a message to the manager corresponding to manager icon 803 that it is now being backed up by the manager corresponding to manager icon 804. Alternatively, the manager corresponding to either manager icon 803 or 804 could be informed by the other manager rather than by manager control process 130.

According to an alternate embodiment, additional textual information that further describes the manager or client systems is included as part of each icon (e.g., either "inside" the shape of the icon or as an additional label next to the icon). Examples of such labels include network addresses, user names, resource names, etc.

In the discussions above, one aspect of the present invention is described as being able to provide an indication of overburdened distributed managers. It is to be appreciated, however, that additional problems within the network can also be indicated in accordance with the present invention. By way of example, "failed" managers (e.g., those that do not respond to polling or other messages), client systems that are not assigned to a manager (e.g., because the manager they were assigned to failed and there is no backup manager, a manager was removed from the system, no manager was been assigned yet, etc.), etc. can all be indicated. These problems can be indicated in any of a wide variety of manners analogous to those discussed above, such as different colors, different outlining of icons, different icons, etc.

Thus, the present invention provides and facilitates interaction with distributed manager information of a network. A user-friendly graphical user interface that advantageously illustrates distributed managers as well as which client systems, and possibly managers, are assigned to which managers. Additionally, one aspect of the present invention allows such assignments to be easily modified in a user-friendly manner. Furthermore, another aspect of the present invention advantageously identifies overburdened managers to a user, while yet another aspect identifies redundancy information to a user and allows such redundancies to be easily modified by the user.

Thus, a method and apparatus for providing and facilitating interaction with distributed manager information of a network has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for assigning client systems in a network, the method comprising:
   displaying as icons at least a subset of distributed managers in the network and at least a subset of client systems in the network; and
   assigning at least one of the client systems to at least one of the distributed managers by associating an icon corresponding to the at least one client system with an icon corresponding to the at least one distributed manager.

2. The method of claim 1, wherein the associating of the icon corresponding to the at least one client system to the icon corresponding to the at least one distributed manager comprises dragging and dropping the icon corresponding to the at least one client system on the icon corresponding to the at least one distributed manager.

3. The method of claim 1, wherein the icons are displayed utilizing a graphical user interface.

4. The method of claim 1, wherein the assigning of the at least one client system to the at least one distributed manager comprises sending messages to the at least one distributed manager and the at least one client system to notify the at least one distributed manager and the at least one client system of the assignment.

5. The method of claim 4, wherein the messages sent to affect the assignment include a message to the at least one client system instructing the at least one client system to communicate status information to the at least one distributed manager.

6. The method of claim 4, wherein the messages sent to affect the assignment include a message to the at least one distributed manager instructing the at least one distributed manager that the at least one distributed manager has management responsibility for the at least one client system.

7. The method of claim 1, wherein assigning at least one of the client systems to at least one of the distributed managers comprises:
   selecting the icon corresponding to the at least one client system to cause a menu listing of all the distributed managers to which the client system can be assigned to be displayed, and
   selecting one of the distributed managers from the menu listing to cause the assignment of the at least one client system to the selected distributed manager.

8. The method of claim 1, further comprising displaying the interrelationships of the distributed managers and the client systems utilizing a tree structure.

9. The method of claim 1, wherein the subset of distributed managers includes each distributed manager within the network.

10. The method of claim 1, further comprising:
    identifying distributed managers of the subset of distributed managers that are overburdened; and
    displaying, via a graphical user interface, the subset of distributed managers in a manner that distinguishes the overburdened distributed managers from the non-overburdened distributed managers.

11. The method of claim 10, wherein the identifying of distributed managers that are overburdened comprises:
    identifying a number of client systems that are managed by each distributed manager of the subset of distributed managers,
    calculating an average number of client systems that are managed for the subset of distributed managers, and
    determining a distributed manager of the subset of distributed managers is overburdened if the distributed manager manages a number of client systems that exceeds the average number of client systems by a threshold amount.

12. The method of claim 1, further comprising:
    obtaining redundancy information by identifying a first distributed manager of the subset of distributed managers that is a backup for a second distributed manager of the subset of distributed managers, and
    displaying, via a graphical user interface, an indication that the first distributed manager is a backup for the second distributed manager.

13. The method of claim 12, wherein the indication comprises a directional arrow.

14. A machine-readable medium having stored thereon a plurality of instructions, designed to be executed by a processor, for implementing a function to:
    display as icons at least a subset of distributed managers in a network and at least a subset of client systems in the network; and
    assign at least one of the client systems to at least one of the distributed managers by associating an icon corresponding to the at least one client system with an icon corresponding to the at least one distributed manager.

15. The machine-readable medium of claim 14, wherein the plurality of instructions for implementing the function of associating the icon corresponding to the at least one client system to the icon corresponding to the at least one distributed manager comprises a plurality of instructions to implement a function of dragging and dropping the icon corresponding to the at least one client system on the icon corresponding to the at least one distributed manager.

16. The machine-readable medium of claim 14, wherein the icons are displayed utilizing a graphical user interface.

17. The machine-readable medium of claim 14, wherein the plurality of instructions for implementing the function of assigning the at least one client system to the at least one distributed manager comprises a plurality of instructions for implementing a function to send messages to the at least one distributed manager and the at least one client system to notify the at least one distributed manager and the at least one client system of the assignment.

18. The machine-readable medium of claim 17, wherein the messages sent to affect the assignment include a message to the at least one client system instructing the at least one client system to communicate status information to the at least one distributed manager.

19. The machine-readable medium of claim 17, wherein the messages sent to affect the assignment include a message to the at least one distributed manager instructing the at least one distributed manager that the at least one distributed manager has management responsibility for the at least one client system.

20. The machine-readable medium of claim 14, wherein the plurality of instructions for implementing the function of assigning at least one of the client systems to at least one of the distributed managers comprises a plurality of instructions for implementing a function to:
select the icon corresponding to the at least one client system to cause a menu listing of all the distributed managers to which the client system can be assigned to be displayed, and
select one of the distributed managers from the menu listing to cause the assignment of the at least one client system to the selected distributed manager.

21. The machine-readable medium of claim 14, further comprising a plurality of instructions for implementing a function to display the interrelationships of the distributed managers and the client systems utilizing a tree structure.

22. The machine-readable medium of claim 14, wherein the subset of distributed managers includes each distributed manager within the network.

23. The machine-readable medium of claim 14, further comprising a plurality of instructions for implementing a function to:
identify distributed managers of the subset of distributed managers that are overburdened; and
display, via a graphical user interface, the subset of distributed managers in a manner that distinguishes the overburdened distributed managers from the non-overburdened distributed managers.

24. The machine-readable medium of claim 23, wherein the plurality of instructions for implementing the function to identify distributed managers that are overburdened comprises a plurality of instructions for implementing a function to:
identify a number of client systems that are managed by each distributed manager of the subset of distributed managers,
calculate an average number of client systems that are managed for the subset of distributed managers, and
determine a distributed manager of the subset of distributed managers is overburdened if the distributed manager manages a number of client systems that exceeds the average number of client systems by a threshold amount.

25. The machine-readable medium of claim 14, further comprising a plurality of instructions for implementing a function to:

obtain redundancy information by identifying a first distributed manager of the subset of distributed managers that is a backup for a second distributed manager of the subset of distributed managers, and
display, via a graphical user interface, an indication that the first distributed manager is a backup for the second distributed manager.

26. The machine-readable medium of claim 25, wherein the indication comprises a directional arrow.

27. An apparatus for assigning client systems in a network, the apparatus comprising:
a display device; and
a control logic, coupled to the display device, including manager control logic operable to,
(i.) display as icons at least a subset of distributed managers in the network and at least a subset of client systems in the network; and
(ii.) assign at least one of the client systems to at least one of the distributed managers by associating an icon corresponding to the at least one client system with an icon corresponding to the at least one distributed manager.

28. The apparatus of claim 27, wherein the associating of the icon corresponding to the at least one client system to the icon corresponding to the at least one distributed manager comprises dragging and dropping the icon corresponding to the at least one client system on the icon corresponding to the at least one distributed manager.

29. The apparatus of claim 27, wherein the icons are displayed on the display device utilizing a graphical user interface.

30. The apparatus of claim 27, wherein the assigning of the at least one client system to the at least one distributed manager comprises the manager control logic sending messages to the at least one distributed manager and the at least one client system to notify the at least one distributed manager and the at least one client system of the assignment.

31. The apparatus of claim 30, therein the messages sent by the manager control logic to affect the assignment include a message to the at least one client system instructing the at least one client system to communicate status information to the at least one distributed manager.

32. The apparatus of claim 30, wherein the messages sent by the manager control logic to affect the assignment include a message to the at least one distributed manager instructing the at least one distributed manager that the at least one distributed manager has management responsibility for the at least one client system.

33. The apparatus of claim 27, wherein assigning at least one of the client systems to at least one of the distributed managers comprises:
selecting the icon corresponding to the at least one client system to cause the manager control logic to display a menu listing of all the distributed managers to which the client system can be assigned, and
selecting one of the distributed managers from the menu listing to cause the manager control logic to assign the at least one client system to the selected distributed manager.

34. The apparatus of claim 27, wherein manager control logic displays the interrelationships of the distributed managers and the client systems utilizing a tree structure.

35. The apparatus of claim 27, wherein the subset of distributed managers includes each distributed manager within the network.

36. The apparatus of claim 27, wherein the manager control logic identifies distributed managers of the subset of distributed managers that are overburdened, and displays, via a graphical user interface, the subset of distributed managers in a manner that distinguishes the overburdened distributed managers from the non-overburdened distributed managers.

37. The apparatus of claim 36, wherein the manager control logic is to identify the distributed managers that are overburdened by, identifying a number of client systems that are managed by each distributed manager of the subset of distributed managers, calculating an average number of client systems that are managed for the subset of distributed managers, and determining a distributed manager of the subset of distributed managers is overburdened if the distributed manager manages a number of client systems that exceeds the average number of client systems by a threshold amount.

38. The apparatus of claim 27, wherein the manager control logic is also to, obtaining redundancy information by identifying a first distributed manager of the subset of distributed managers that is a backup for a second distributed manager of the subset of distributed managers, and displaying, via a graphical user interface, an indication that the first distributed manager is a backup for the second distributed manager.

39. The apparatus of claim 38, wherein the indication comprises a directional arrow.

* * * * *